United States Patent
Santolli

(10) Patent No.: US 10,988,157 B2
(45) Date of Patent: Apr. 27, 2021

(54) RACK FOR HOLDING OR SECURING BOTTLES ADAPTABLE TO A SHOPPING CART AND A SHOPPING CART CONTAINING THE SAME

(71) Applicant: Charlotte Santolli, Wyckoff, NJ (US)

(72) Inventor: Charlotte Santolli, Wyckoff, NJ (US)

(73) Assignee: CFS Inventions, LLC, Wyckoff, NJ (US)

( * ) Notice: Subject to any disclaimer, the term of this patent is extended or adjusted under 35 U.S.C. 154(b) by 0 days.

(21) Appl. No.: 16/573,716

(22) Filed: Sep. 17, 2019

(65) Prior Publication Data
US 2020/0010103 A1    Jan. 9, 2020

Related U.S. Application Data

(63) Continuation of application No. 15/804,892, filed on Nov. 6, 2017, now Pat. No. 10,449,985.

(60) Provisional application No. 62/418,346, filed on Nov. 7, 2016.

(51) Int. Cl.
*B62B 3/14* (2006.01)
*A47B 73/00* (2006.01)

(52) U.S. Cl.
CPC ............ *B62B 3/1464* (2013.01); *A47B 73/00* (2013.01); *B62B 3/1472* (2013.01); *B62B 2202/021* (2013.01); *B62B 2202/023* (2013.01)

(58) Field of Classification Search
CPC ....... B62B 3/14; B62B 3/1468; B62B 3/1472; B62B 2501/067
See application file for complete search history.

(56) References Cited

U.S. PATENT DOCUMENTS

| | | | |
|---|---|---|---|
| 2,279,442 A | 4/1942 | Burns et al. | |
| 2,763,413 A | 9/1956 | Felton | |
| 3,154,209 A | 10/1964 | Wilhite et al. | |
| 3,534,973 A | 10/1970 | Elliott | |
| 5,265,893 A | 11/1993 | Ettlin | |
| 6,354,612 B1 | 3/2002 | Adamson | |
| 6,565,102 B2 | 5/2003 | Buckley, III | |

(Continued)

FOREIGN PATENT DOCUMENTS

| | | | | |
|---|---|---|---|---|
| DE | 10143912 A1 * | 3/2003 | ........... | B62B 3/1472 |
| DE | 10143912 A1 | 3/2003 | | |

(Continued)

OTHER PUBLICATIONS

International Search Report and Written Opinion issued in International Application No. PCT/US2017/060233 dated Jan. 12, 2018, 7 pages.

*Primary Examiner* — Bryan A Evans
(74) *Attorney, Agent, or Firm* — Remenick PLLC

(57) ABSTRACT

A rack for holding or securing bottles adaptable to a shopping cart that is useful for holding or securing and transporting bottles such as, for instance, beverage bottles is described herein. Also, a shopping cart containing such a rack is described. The rack is substantially planar and features a plurality of receiving spaces, substantially circular in shape, and of varying sizes, adapted to engage or restrain the bottles in only one place or in only one plane. The rack may be adapted for fastening or locking engagement to a shopping cart and may feature any suitable fastener or locking mechanism, and it may be rigid or collapsible, or completely removable from the shopping cart.

24 Claims, 13 Drawing Sheets

(56) References Cited

U.S. PATENT DOCUMENTS

| | | |
|---|---|---|
| 6,644,674 B2 | 11/2003 | Simard |
| 7,396,025 B2 | 7/2008 | Ondrasik |
| 7,887,068 B2 | 2/2011 | Ferguson |
| 8,783,697 B1 * | 7/2014 | Wilhite ................ B62B 3/1472 224/411 |
| 9,802,635 B1 * | 10/2017 | White ................ B62B 3/1468 |
| 2003/0178381 A1 | 9/2003 | Liang |
| 2006/0186621 A1 | 8/2006 | Buckley, III |

FOREIGN PATENT DOCUMENTS

| | | |
|---|---|---|
| FR | 2547711 A2 | 12/1984 |
| FR | 2758117 A1 | 7/1998 |
| FR | 2758118 A1 | 7/1998 |

* cited by examiner

RACK FOR HOLDING OR SECURING BOTTLES ADAPTABLE TO A SHOPPING CART AND A SHOPPING CART CONTAINING THE SAME

CROSS-REFERENCE TO RELATED APPLICATIONS

This application is a continuation of U.S. patent application Ser. No. 15/804,892, filed Nov. 6, 2017, which claims the benefit of priority to U.S. Provisional Application No. 62/418,346, filed Nov. 7, 2106, each of which is incorporated herein by reference.

FIELD OF THE INVENTION

This invention relates to an improved rack for bottles adaptable to a shopping cart and useful

BACKGROUND OF THE INVENTION

Wilhite, U.S. Pat. No. 3,154,209 teaches a receptacle for holding cylindrical objects independent of a shopping cart and having both a top and bottom surface with receptacles for engaging both the bottom and the sides of the cylindrical object such as a bottle.

Elliott, U.S. Pat. No. 3,534,973 teaches a collapsible rack having a bottom surface and at least three side walls for holding articles of various shapes in a shopping cart.

Ettlin, U.S. Pat. No. 5,265,893 teaches a shopping cart shelf that is substantially planar attachable to and contained within the shopping cart. However, it is for holding articles of various shapes in a shopping cart and does not engage a cylindrical object such as a bottle in particular.

Adamson, U.S. Pat. No. 6,354,612 teaches a tray for a shopping cart that is substantially planar, retractable, attachable to, and contained within the shopping cart. However, it is for holding articles of various shapes in a shopping cart and does not engage a cylindrical object such as a bottle in particular.

Simard, U.S. Pat. No. 6,664,674 teaches a multi-compartment shopping cart having five distinct compartments. However, the shopping cart is for holding articles of various shapes and is not adapted for containing or isolating a cylindrical object such as a bottle in particular.

Ondrasik, U.S. Pat. No. 7,396,025 teaches a multi-compartment shopping cart having distinct compartments and including a child's seat. However, the shopping cart is for holding articles of various shapes and is not adapted for containing or isolating a cylindrical object such as a bottle in particular.

Ferguson, U.S. Pat. No. 7,887,068 teaches a multi-compartment shopping cart having knobs, ridges or protrusions upon which plastic store bags may be hung. However, the shopping cart is for holding articles of various shapes and is not adapted for containing or isolating a cylindrical object such as a bottle in particular.

Wilhite, U.S. Pat. No. 8,783,697 teaches a holder or tray for a shopping cart that is substantially planar, retractable, attachable to, rotatable with respect to, and contained within the shopping cart. The holder or tray is for holding bottles and features apertures of various shapes or sizes for receiving and engaging the bottles at their base.

Liang, U.S. Patent Publication 2003/0178381 teaches a collapsible article holder adaptable for holding bottles and engaging the bottles in multiple (two) locations on the sides of the bottles. The collapsible article holder maintains the bottles in a substantially horizontal position independent of a shopping cart.

Buckley, III, U.S. Patent Publication 2006/0186621 teaches a collapsible article holder for attaching to or engaging a shopping cart and pivotally mounted inside the cart. However, the collapsible article holder is for holding articles of various shapes and is not adapted for containing or isolating a cylindrical object such as a bottle in particular.

Caillaud, French Patent Publication 2547711 teaches a collapsible article holder for attaching to or engaging a shopping cart and mounted inside the cart. However, the collapsible article holder is for holding articles of various shapes and is not adapted for containing or isolating a cylindrical object such as a bottle in particular.

Yacine, French Patent Publication 2758118 teaches an article for holding cylindrical objects independent of a shopping cart but attachable to the inside or outside of a shopping cart and having both a top and bottom surface with receptacles for engaging both the bottom and the sides of the cylindrical object such as a bottle.

Schaub, German Patent Publication 10143912 teaches an article holder for attaching to or engaging a shopping cart and mounted inside the cart. However, it is for holding articles of various shapes in a shopping cart and does not engage a cylindrical object such as a bottle in particular either at its base or neck.

It would be useful and desirable to provide an improved rack for holding or securing bottles adaptable to a shopping cart that is useful for holding, securing, and transporting bottles such as, for instance, beverage bottles. Specifically, it is desirable to provide a rack that is substantially planar and of a single plane or two or three planes for both engaging the shopping cart and the bottles. It is also desirable to provide a rack that is attachable to or may be engaged with the top surface of the shopping cart in at least a portion of the top surface of the shopping cart. It is also desirable to provide a rack that is collapsible with respect to the top surface of the shopping cart when not in use for engaging, holding or securing bottles. It is further desirable to provide a rack that engages or holds or secures the bottles only in one or two or three places, e.g. substantially the neck or the body of the bottle, not the base. It is still further desirable to provide a rack that features apertures of varying sizes for engaging bottles of various sizes.

All publications, patent applications, patents and other reference material mentioned are incorporated by reference in their entirety. In addition, the materials, methods and examples are only illustrative and are not intended to be limiting. The citation of references herein is not to be construed as an admission that the references are prior art to the present invention.

SUMMARY OF THE INVENTION

In a first aspect, the invention provides a rack for holding or securing bottles adaptable to a shopping cart that is useful for holding and transporting bottles such as, for instance, beverage bottles. The beverage bottles may be for instance, soda, wine, milk or liquor bottles and may be glass, cardboard or plastic. The rack for holding bottles adaptable to a shopping cart features a plurality of receiving spaces that may be substantially circular in shape, and the plurality of receiving spaces may be of varying sizes, for instance, of varying diameters or circumferences. There may be 3, 4, 5, 6, 7, 8, 9, 10, 11, 12, 15, 18, 20, 24 or more such receiving spaces. The rack for holding or securing bottles adaptable to a shopping cart may be substantially or completely planar, and may be adapted to engage the shopping cart and the bottles in substantially a single plane. That is, the plurality of receiving spaces may be defined by a single plane. The plurality of receiving spaces may be adapted to engage or restrain the bottles in only one place or in only one plane, such as, for instance, the neck portion or the body or the bottom of the bottles.

In some instances, the rack for holding or securing bottles adaptable to a shopping cart may be adapted to engage or hold or secure bottles in two or three or more distinct planes. That is, there may be provided a plurality of receiving spaces on two or three or more distinct planes or surfaces that may be arranged substantially in parallel one to the other. The two or three or more distinct planes or surfaces that may be engaged or fastened or connected to each other by any suitable connecting means such as, for instance, a bolt, a bar, or a hinge. The plurality of receiving spaces may be adapted to engage or hold or secure the bottles in two or three or more places or in two or three or more distinct planes, such as, for instance, the neck portion of the bottles or the body of the bottles.

The rack for holding or securing bottles adaptable to a shopping cart may be formed of any suitable material or combination of materials such as wood, fiber board, pressboard, rubber, plastic, metal or cardboard. The rack for holding or securing bottles adaptable to a shopping cart may be designed for extended life or it may be formed of one or more materials adapted to be disposed of after one or a few or several uses. The rack for holding or securing bottles adaptable to a shopping cart may be of any suitable shape such as substantially rectangular, square, oblong, elliptical, round, etc. Similarly, it may be of any suitable size such as, for instance, about 1, 2, 3, 4, or 5 or more feet long, about 1, 2, 3, 4, or 5 or more feet wide, and about 0.1", 0.2", 0.3", 0.5", 0.75", or 1" or more thick. The receiving spaces may be of any suitable size, such as, for instance, about 1, 2, 3, 4, 5, 6, 7, 8, 9, 10, 11, or 12 or more inches in diameter. Likewise, the receiving spaces may represent 1, 2, 3, 4, 5, 6, 7, 8, 9, 10, 11, or 12 or more different sizes within the rack for holding or securing bottles adaptable to a shopping cart.

The rack for holding or securing bottles adaptable to a shopping cart may be adapted for fastening or locking engagement to a shopping cart. The fastening or locking engagement may be in substantially one plane and may be made to the top or side portion of the walls or sides of the shopping cart. The rack for holding or securing bottles adaptable to a shopping cart may be equipped with any suitable fastener or locking mechanism such as, for instance, a clip, a hook, a member adapted to fit over and engage the wall or side of the shopping cart, or a member adapted to fit over and engage the wall or side of the shopping cart through individual bands or strands forming the wall or side of the shopping cart effectively passing through the spaces defined by such bands or strands. The rack for holding or securing bottles adaptable to a shopping cart may be adapted for engaging or being secured to the top of the shopping cart so as to effectively define a fourth wall or side, effectively a top for the shopping cart. In some instances, the rack for holding or securing bottles adaptable to a shopping cart may occupy only a portion of the top of the shopping cart, for instance, about a third, about half, about two-thirds or about three-fourths of the open top of the shopping cart. In some instances, the rack for holding or securing bottles adaptable to a shopping cart may be adapted to fit within the shopping cart and engage the shopping cart walls or sides at a point, for instance, about one fourth, one third, one half, two thirds or three fourths or so from the floor or bottom to the top of the shopping cart.

The rack for holding or securing bottles adaptable to a shopping cart may be rigid or it may be collapsible at one or more points. That is, it may be, for instance, bifold or trifold. The collapsible points may be provided by one or more pivoting means provided so that the rack for holding or securing bottles adaptable to a shopping cart may be collapsible into a smaller total size that may be for instance, in half, in thirds or in quarters. Similarly, the rack for holding or securing bottles adaptable to a shopping cart may be completely and entirely removable from the shopping cart or the rack for holding or securing bottles adaptable to a shopping cart may be permanently or semi-permanently affixed to the shopping cart. The rack for holding or securing bottles adaptable to a shopping cart may be collapsible with respect to one or more walls or sides of the shopping cart so that the rack for holding or securing bottles adaptable to a shopping cart may remain engaged with the shopping cart even when not in use such as, for instance, by any suitable engaging means such as a clip, a hook, or a member adapted to fit over and engage the wall or side of the shopping cart or the bottom of the shopping cart, such as, for instance, pivotally engaging.

The rack for holding or securing bottles adaptable to a shopping cart may be collapsed by means of a motor or cranking system suitably attached thereto or it may be spring loaded.

The rack for holding or securing bottles adaptable to a shopping cart may be permanently affixed thereto without collapsible points.

In a second aspect, the invention provides a shopping cart featuring a rack for holding or securing bottles adaptable to a shopping cart that is useful for holding or securing and transporting bottles such as, for instance, beverage bottles. The beverage bottles may be for instance, soda, wine, or liquor bottles. The rack for holding or securing bottles adaptable to a shopping cart features a plurality of receiving spaces that may be substantially circular in shape, and the plurality of receiving spaces may be of varying sizes, for instance, of varying diameters or circumferences. There may be 3, 4, 5, 6, 7, 8, 9, 10, 11, 12, 15, 18, 20, 24 or more such receiving spaces. The rack for holding or securing bottles adaptable to a shopping cart may be substantially or completely planar, and may be adapted to engage the shopping cart and the bottles in substantially a single plane. That is, the plurality of receiving spaces may be defined by a single plane. The plurality of receiving spaces may be adapted to engage or restrain the bottles in only one place or in only one plane, such as, for instance, the neck, body or bottom portion of the bottles. In some instances, the rack for holding or securing bottles adaptable to a shopping cart may be adapted to engage or hold or secure bottles in two or three or more distinct planes. That is, there may be provided a plurality of receiving spaces on two or three or more distinct planes or surfaces that may be arranged substantially in parallel one to the other. The two or three or more distinct planes or surfaces that may be engaged or fastened or connected to each other by any suitable connecting means such as, for instance, a bolt, a bar, or a hinge. The plurality of receiving spaces may be adapted to engage or hold or secure the bottles in two or three or more places or in two or three or more distinct planes, such as, for instance, the neck portion of the bottles or the body of the bottles.

The rack for holding or securing bottles adaptable to a shopping cart may be formed of any suitable material or combination or materials such as wood, fiber board, pressboard, rubber, plastic, metal or cardboard. The rack for holding or securing bottles adaptable to a shopping cart may be designed for extended life or it may be formed of one or more materials adapted to be disposed of after one or a few or several uses. The rack for holding or securing bottles adaptable to a shopping cart may be of any suitable shape such as substantially rectangular, square, oblong, elliptical, round, etc. Similarly, it may be of any suitable size such as, for instance, about 1, 2, 3, 4, or 5 or more feet long, about 1, 2, 3, 4, or 5 or more feet wide, and about 0.1", 0.2", 0.3", 0.5", 0.75", or 1" or more thick. The receiving spaces may be of any suitable size, such as, for instance, about 1, 2, 3, 4, 5, 6, 7, 8, 9, 10, 11, or 12 or more inches in diameter. Likewise, the receiving spaces may represent 1, 2, 3, 4, 5, 6, 7, 8, 9, 10, 11, or 12 or more different sizes within the rack for holding or securing bottles adaptable to a shopping cart.

The rack for holding or securing bottles adaptable to a shopping cart may be adapted for fastening or locking engagement to the shopping cart. The fastening or locking engagement may be in substantially one plane and may be made to the top or side portion of the walls or sides of the shopping cart. The rack for holding or securing bottles adaptable to a shopping cart may be equipped with any suitable fastener or locking mechanism such as, for instance, a clip, a hook, a member adapted to fit over and engage the wall or side of the shopping cart, or a member adapted to fit over and engage the wall or side of the shopping cart through individual bands or strands forming the wall or side of the shopping cart effectively passing through the spaces defined by such bands or strands. The rack for holding or securing bottles adaptable to a shopping cart may be adapted for engaging or being secured to the top of the shopping cart so as to effectively define a fourth wall or side, effectively a top for the shopping cart. In some instances, the rack for holding or securing bottles adaptable to a shopping cart may occupy only a portion of the top of the shopping cart, for instance, about a third, about half, about two-thirds or about three-fourths of the open top of the shopping cart. In some instances, the rack for holding or securing bottles adaptable to a shopping cart may be adapted to fit within the shopping cart and engage the shopping cart walls or sides at a point, for instance, about one fourth, one third, one half, two thirds or three fourths or so from the floor or bottom to the top of the shopping cart.

The rack for holding or securing bottles adaptable to a shopping cart may be rigid or it may be collapsible at one or more points. The collapsible points may be provided by one or more pivoting means provided so that the rack for holding or securing bottles adaptable to a shopping cart may be collapsible into a smaller total size that may be for instance, in half, in thirds or in quarters. Similarly, the rack for holding or securing bottles adaptable to a shopping cart may be completely and entirely removable from the shopping cart or the rack for holding or securing bottles adaptable to a shopping cart may be permanently or semi-permanently affixed to the shopping cart. The rack for holding or securing bottles adaptable to a shopping cart may be collapsible with respect to one or more walls or sides of the shopping cart so that the rack for holding or securing bottles adaptable to a shopping cart may remain engaged with the shopping cart even when not in use such as, for instance, by any suitable engaging means such as a clip, a hook, or a member adapted to fit over and engage the wall or side of the shopping cart such as, for instance, pivotally engaging.

DETAILED DESCRIPTION OF THE PREFERRED EMBODIMENTS

The improved rack for holding or securing bottles adaptable to a shopping cart, useful for holding and transporting bottles such as, for instance, beverage bottles, described herein is substantially planar and of a single plane for both engaging the shopping cart and the bottles. The rack is attachable to or may be engaged with the top surface of the shopping cart in at least a portion of the top surface of the shopping cart, engages the bottles only in one place, i.e. substantially the neck of the bottle, not the base, and features apertures or receiving spaces of varying sizes for engaging bottles of various sizes.

Figure 1:
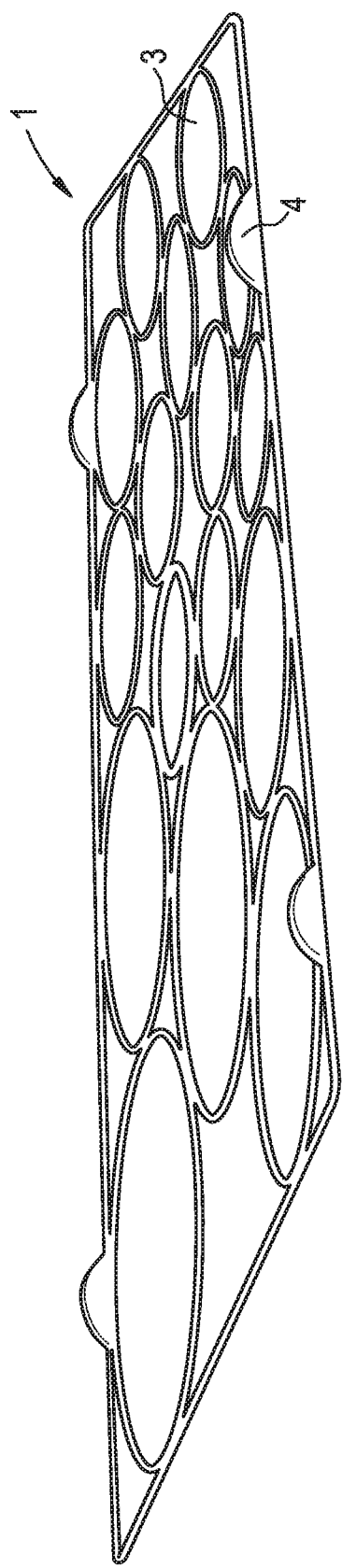
FIG. 1 is a view depicting a rack for holding or securing bottles adaptable to a shopping cart 1, in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4.

Referring to FIG. 1, a view depicting a rack for holding or securing bottles adaptable to a shopping cart 1, in a single plane, featuring a plurality of receiving spaces 3, circular in shape and of varying sizes is provided. The rack for holding or securing bottles adaptable to a shopping cart 1 is adapted for fastening or locking engagement to the shopping cart with a fastener or locking mechanism, in this instance a clip or hook 4. In fact, three different sizes and shapes of hooks or clips 4 are provided.

Figure 2:
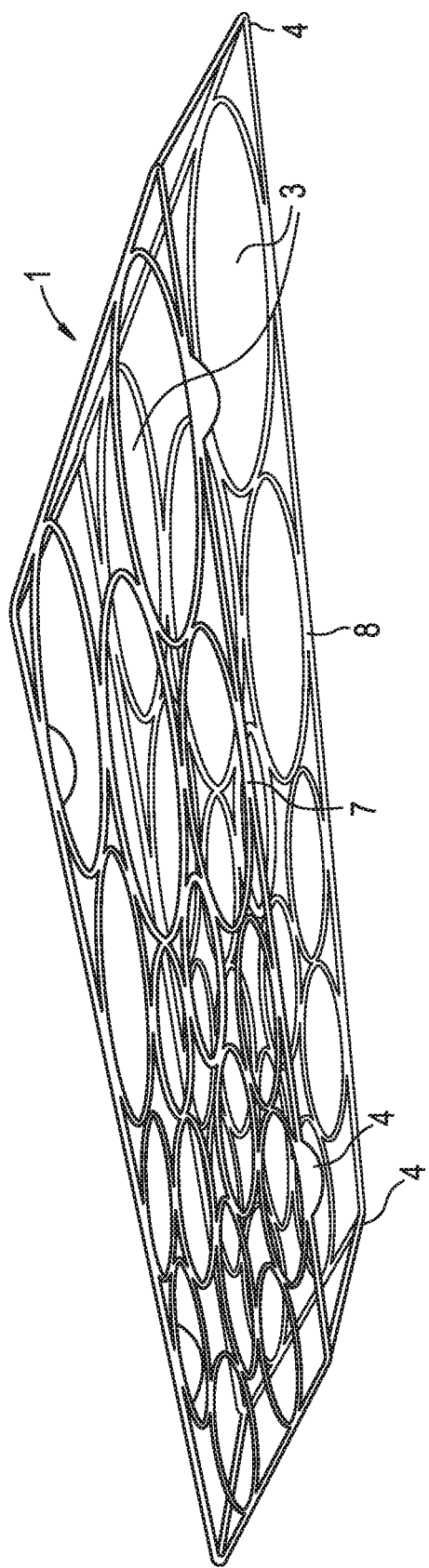
FIG. 2 is a view depicting a rack for holding or securing bottles adaptable to a shopping cart 1, having two planes, a first plane 7, and a second plane 8, featuring a plurality of receiving spaces 3 in two planes, circular in shape and of varying sizes. The rack for holding or securing bottles adaptable to a shopping cart 1 is adapted for fastening or locking engagement to the shopping cart with a fastener or locking mechanism, in this instance a clip or hook 4.

FIG. 2 is another view depicting a rack for holding or securing bottles adaptable to a shopping cart 1, in two planes, a first plane 7, and a second plane 8, featuring a plurality of receiving spaces 3, circular in shape and of varying size. The rack for holding or securing bottles adaptable to a shopping cart 1 is adapted for fastening or locking engagement to the shopping cart with a fastener or locking mechanism, in this instance a clip or hook 4. In fact, three different sizes and shapes of hooks or clips 4 are provided.

Figure 3:
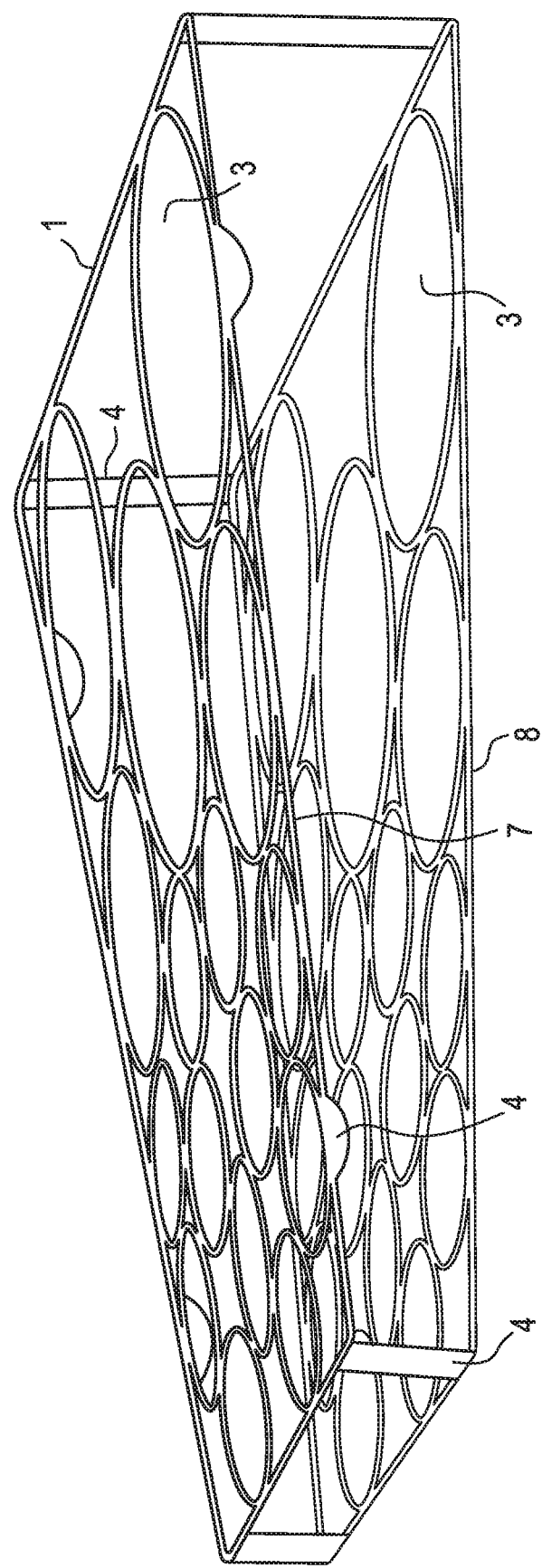
FIG. 3 is a view depicting a rack for holding or securing bottles adaptable to a shopping cart 1, having two planes, a first plane 7, and a second plane 8, featuring a plurality of receiving spaces 3 in two planes, circular in shape and of varying sizes. The rack for holding or securing bottles adaptable to a shopping cart 1 is adapted for fastening or locking engagement to the shopping cart with a fastener or locking mechanism, in this instance a clip or hook 4.

FIG. 3 is a view depicting a rack for holding or securing bottles adaptable to a shopping cart 1, in two planes, a first plane 7, and a second plane 8, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4. In fact, three different sizes and shapes of hooks or clips 4 are provided.

Figure 4:
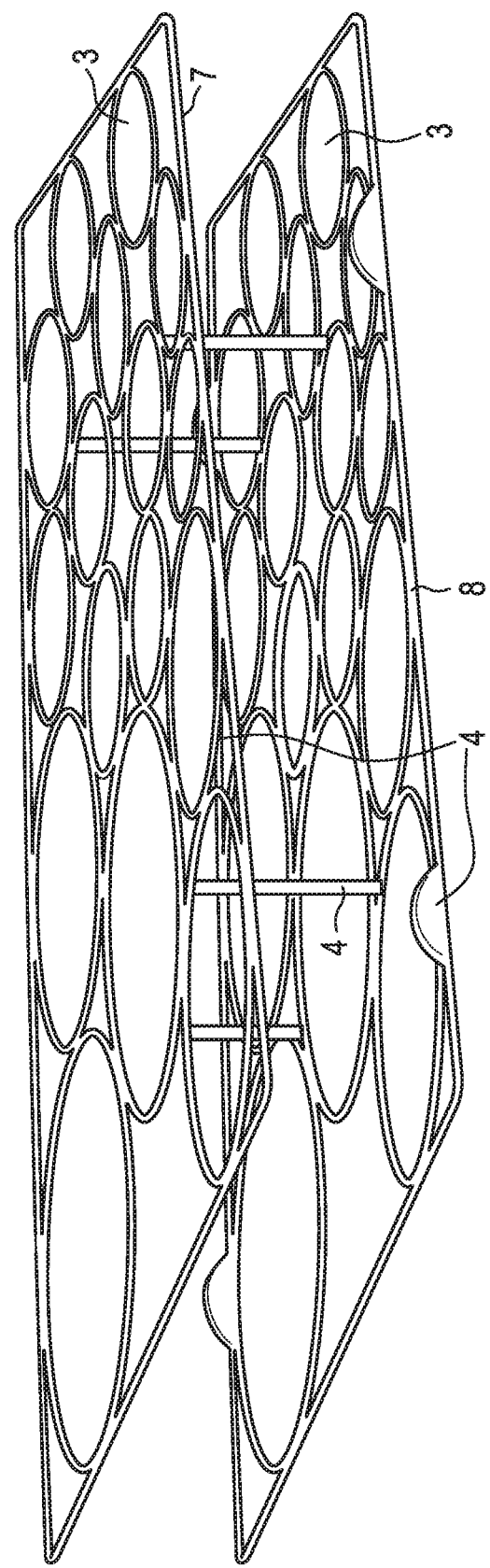
FIG. 4 is a view depicting a rack for holding or securing bottles adaptable to a shopping cart 1, having two planes, a first plane 7, and a second plane 8, featuring a plurality of receiving spaces 3 in two planes, circular in shape and of varying sizes. The rack for holding or securing bottles adaptable to a shopping cart 1 is adapted for fastening or locking engagement to the shopping cart with a fastener or locking mechanism, in this instance a clip or hook 4.

FIG. 4 is a view depicting a rack for holding or securing bottles adaptable to a shopping cart 1, in two planes, a first plane 7, and a second plane 8, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4. At least two different sizes and shapes of hooks or clips 4 are provided.

Figure 5:
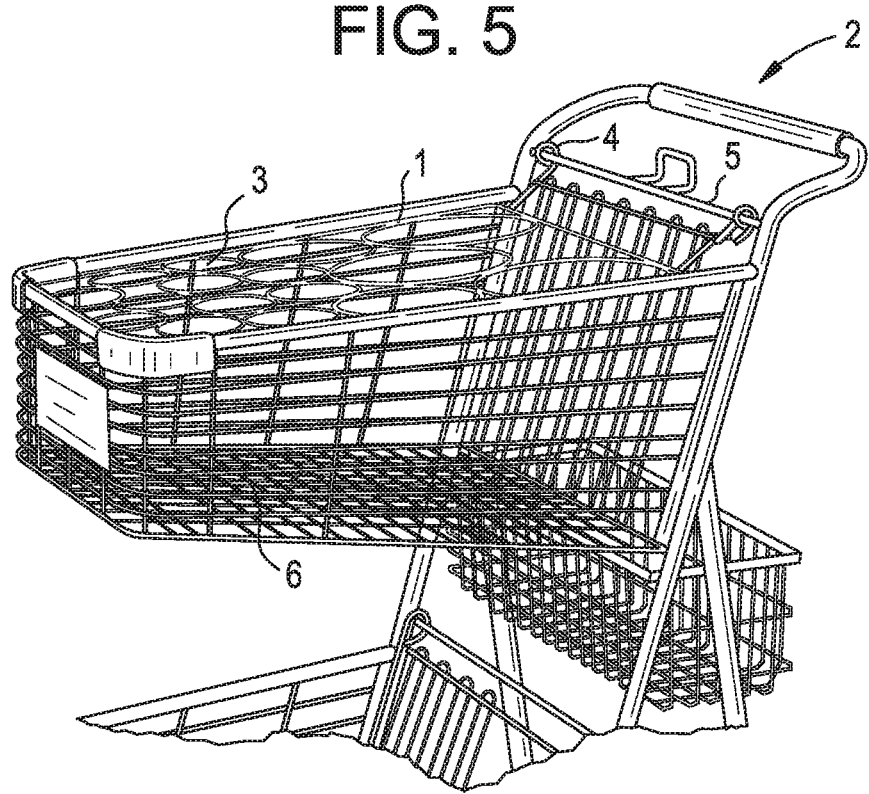
FIG. 5 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2.

FIG. 5 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2. The rack for holding or securing bottles adaptable to the shopping cart 1 is substantially rigid, not collapsible nor collapsible with respect to the shopping cart 2.

Figure 6:
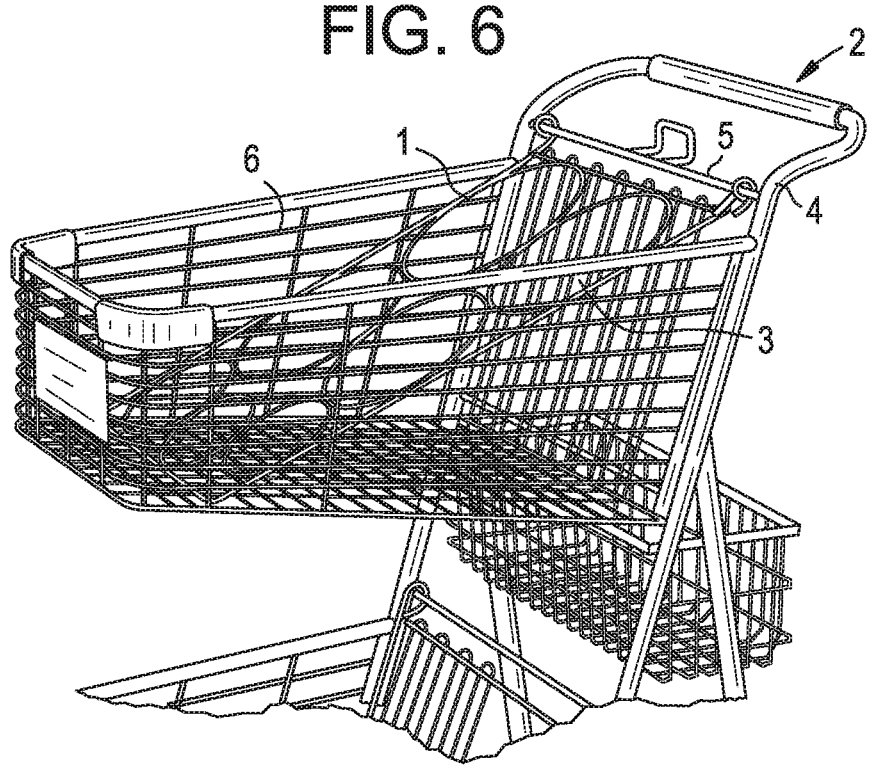
FIG. 6 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2.

FIG. 6 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2. The rack for holding or securing bottles adaptable to the shopping cart 1 is collapsible with respect to the shopping cart 2.

Figure 7:
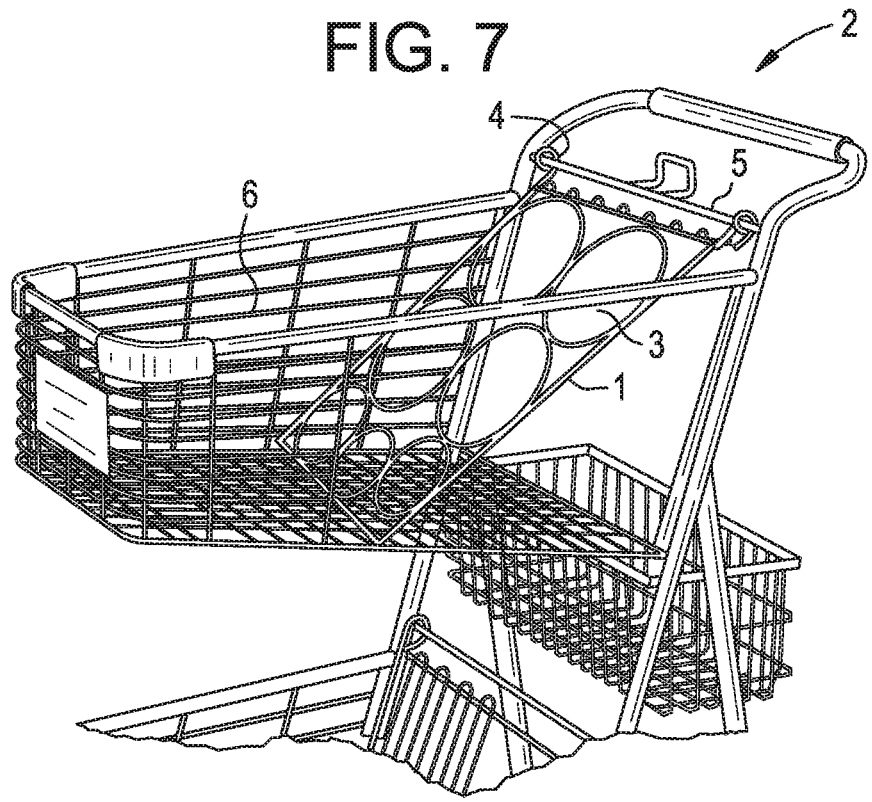
FIG. 7 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2.

FIG. 7 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2. The rack for holding or securing bottles adaptable to the shopping cart 1 is collapsible with respect to the shopping cart 2.

Figure 8:
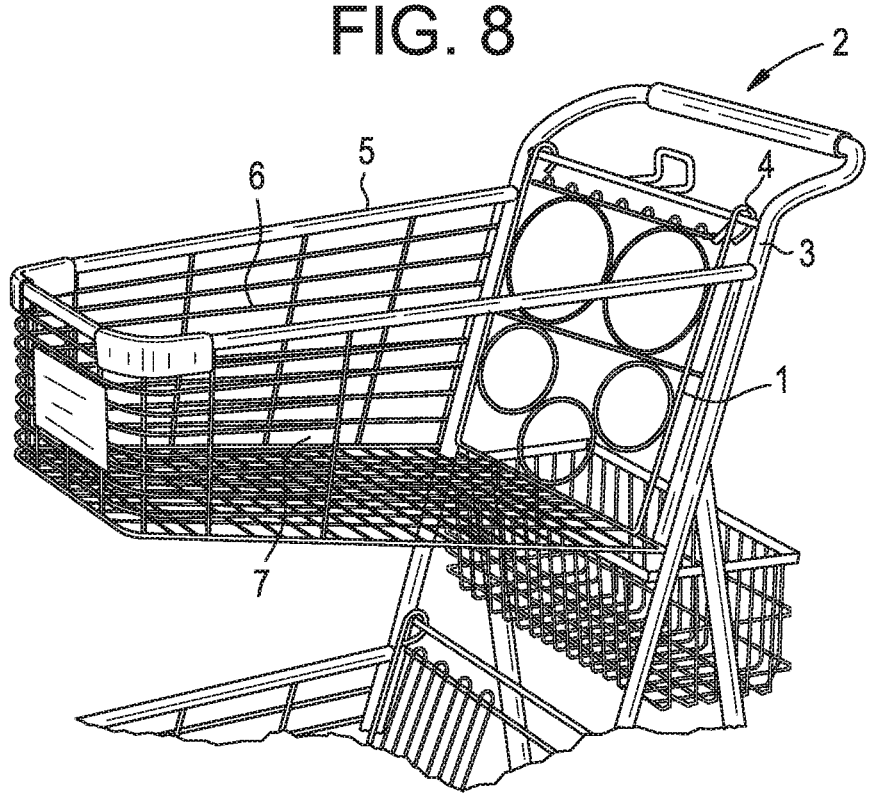
FIG. 8 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2.

FIG. 8 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to fit over and engage the top portion 5 of the wall or side 6 of the shopping cart 2. The rack for holding or securing bottles adaptable to the shopping cart 1 is completely collapsible with respect to the shopping cart 2 and may be collapsed into a position to completely expose the receiving space 7 of the shopping cart 2.

Figure 9:
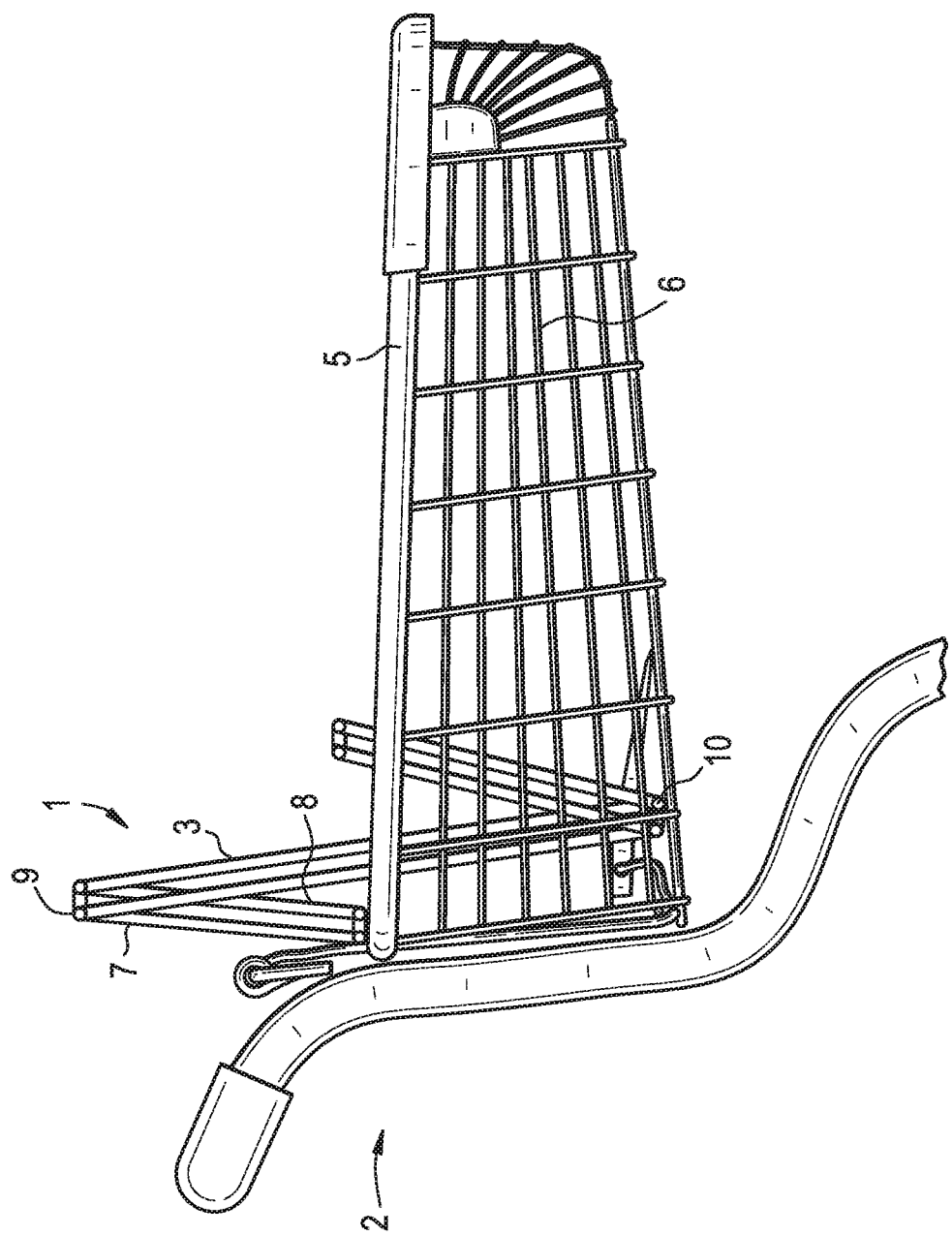
FIG. 9 is a view depicting a shopping cart 2 containing a rack for holding or securing bottles adaptable to the shopping cart 1 that is collapsible into three parts, i.e. collapsible in thirds at a first collapsible point 9 and a second collapsible point 10. The rack for holding or securing bottles adaptable to the shopping cart 1 is in two planes, a first plane 7 and a second plane 8, featuring a plurality of receiving spaces 3, circular in shape and of varying sizes (not visible). The rack for holding or securing bottles adaptable to a shopping cart 1 is adapted for fastening engagement to the shopping cart adapted to fit over and engage the top portion 5 of the wall or side 6 of the shopping cart 2.

FIG. 9 is a view depicting a shopping cart 2 containing a rack for holding or securing bottles adaptable to the shopping cart 1 that is collapsible into three parts, i.e. collapsible in thirds at a first collapsible point 9 and a second collapsible point 10. The rack for holding or securing bottles adaptable to the shopping cart 1 is in two planes, a first plane 7 and a second plane 8, featuring a plurality of receiving spaces 3, circular in shape and of varying sizes (not visible). The rack for holding or securing bottles adaptable to a shopping cart 1 is adapted for fastening engagement to the shopping cart adapted to fit over and engage the top portion 5 of the wall or side 6 of the shopping cart 2.

Figure 10:
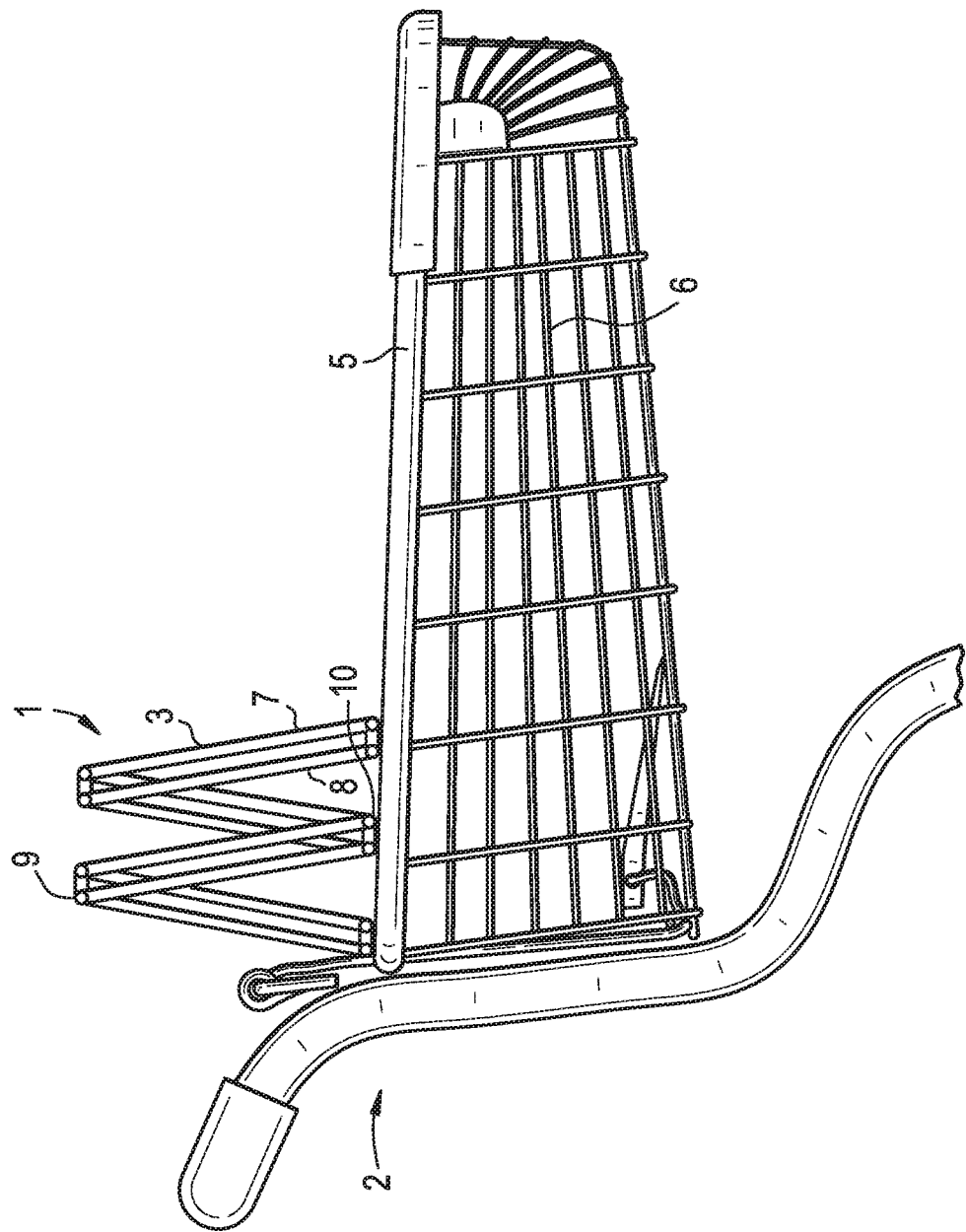
FIG. 10 is a view depicting a shopping cart 2 containing a rack for holding or securing bottles adaptable to the shopping cart 1 that is collapsible into three parts, i.e. collapsible in thirds at a first collapsible point 9 and a second collapsible point 10. The rack for holding or securing bottles adaptable to the shopping cart 1 is in two planes, a first plane 7 and a second plane 8, featuring a plurality of receiving spaces 3, circular in shape and of varying sizes (not visible). The rack for holding or securing bottles adaptable to a shopping cart 1 is adapted for fastening engagement to the shopping cart adapted to fit over and engage the top portion 5 of the wall or side 6 of the shopping cart 2.

FIG. 10 is a view depicting a shopping cart 2 containing a rack for holding or securing bottles adaptable to the shopping cart 1 that is collapsible into three parts, i.e. collapsible in thirds at a first collapsible point 9 and a second collapsible point 10. The rack for holding or securing bottles adaptable to the shopping cart 1 is in two planes, a first plane 7 and a second plane 8, featuring a plurality of receiving spaces 3, circular in shape and of varying sizes (not visible). The rack for holding or securing bottles adaptable to a shopping cart 1 is adapted for fastening engagement to the shopping cart adapted to fit over and engage the top portion 5 of the wall or side 6 of the shopping cart 2.

Figure 11:
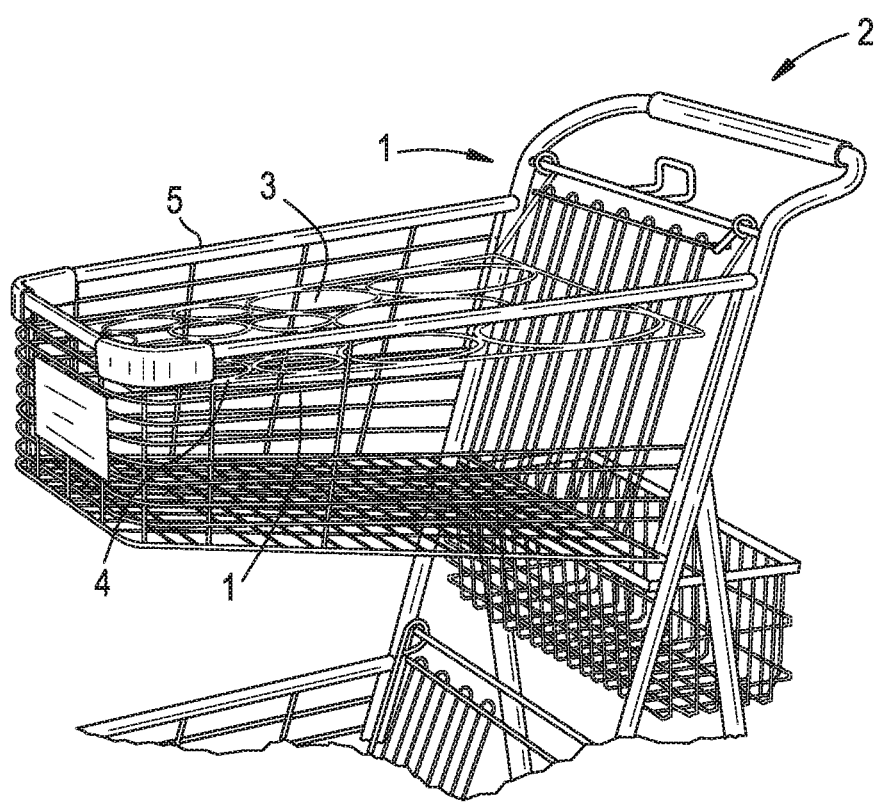
FIG. 11 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to engage the receiving space of the shopping cart 2 at or on the wall or side 6 of the shopping cart 2 at a position below the top portion 5 of the shopping cart 2 and within the receiving space thereof.

FIG. 11 is a view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart with a fastener or locking mechanism, in this instance a clip or hook 4, adapted to engage the receiving space of the shopping cart 2 at or on the wall or side 6 of the shopping cart 2 at a position below the top portion 5 of the shopping cart 2 and within the receiving space thereof.

Figure 12:
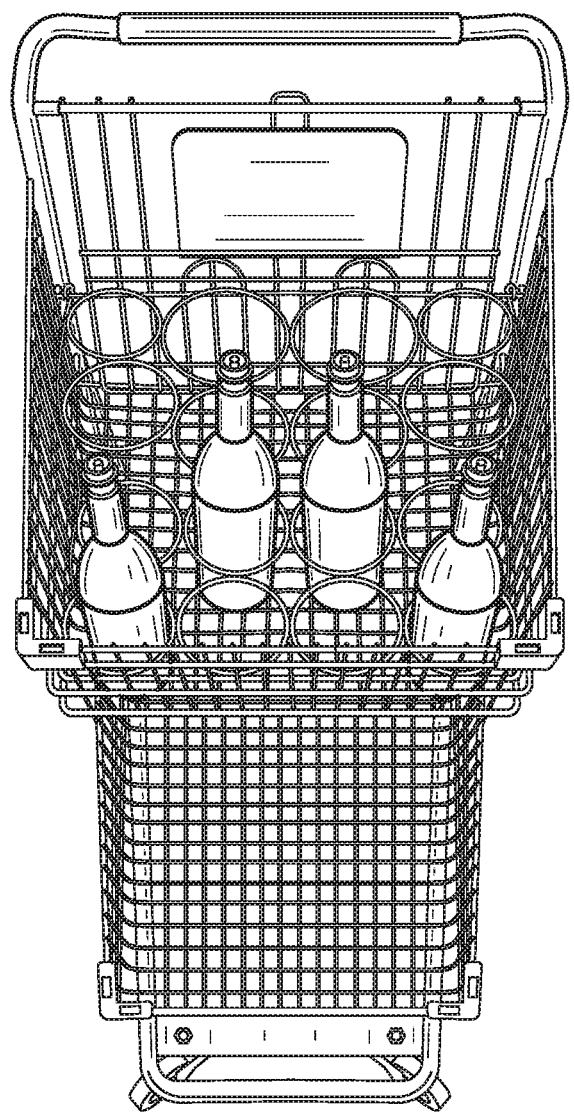
FIG. 12 is a top view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

FIG. 12 is a top view depicting a shopping cart 2 containing a rack for holding or securing bottles adaptable to the shopping cart 1 and showing bottles contained therein. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

Figure 13:
FIG. 13 is a side view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

FIG. 13 is a side view depicting a shopping cart 2 containing a rack for holding or securing bottles adaptable to the shopping cart 1 and showing bottles contained therein. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

Figure 14:
FIG. 14 is a top view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

FIG. 14 is a top view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes, and showing bottles contained therein. The rack for holding or securing bottles adaptable to a shopping cart 1 is adapted for fastening or locking engagement to the shopping cart and is contained within the receiving space of the shopping cart 2.

Figure 15:
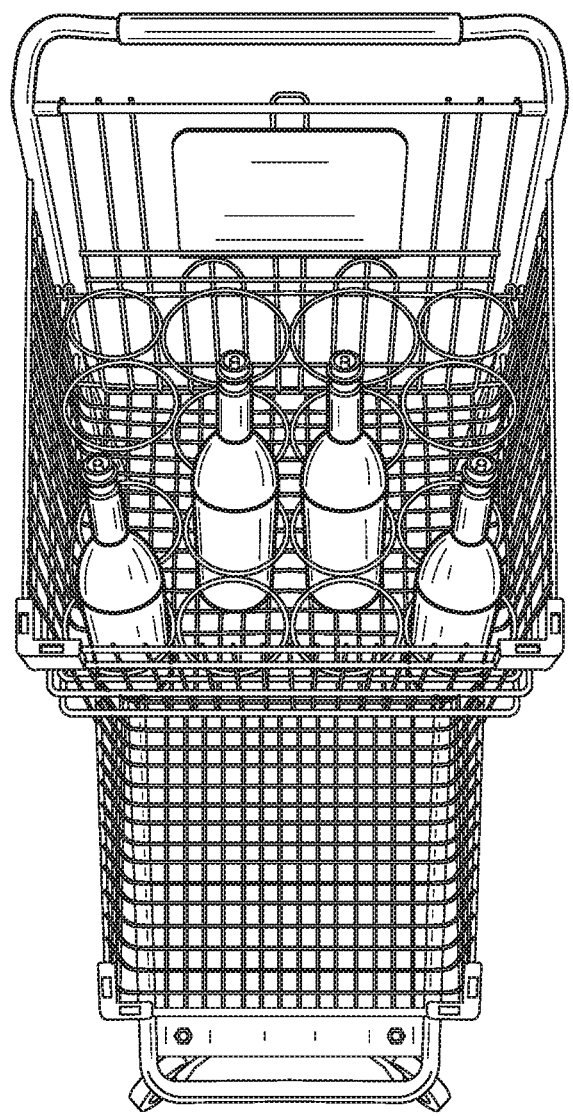
FIG. 15 is a front view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes. The rack for holding or securing bottles adaptable to a shopping cart 1 is adapted for fastening or locking engagement to the shopping cart and is contained within the receiving space of the shopping cart 2.

FIG. 15 is a front view depicting a shopping cart 2 containing a rack for holding or securing bottles adaptable to the shopping cart 1. The rack for holding or securing bottles adaptable to the shopping cart 1 is in a single plane, featuring a plurality of receiving spaces 3, circular in shape and of varying sizes and showing bottles contained therein. The rack for holding or securing bottles adaptable to a shopping cart 1 is adapted for fastening or locking engagement to the shopping cart and is contained within the receiving space of the shopping cart 2.

I claim:
1. A rack for holding or securing bottles adaptable to a shopping cart comprising a plurality of receiving spaces and a means for fastening to or locking engagement to the shopping cart, wherein the receiving spaces are adapted to engage or restrain the bottles at the neck or body of the bottles.

2. A rack for holding or securing bottles adaptable to a shopping cart according to claim 1 wherein the receiving spaces are substantially circular in shape and of two or more varying diameters or circumferences.

3. A rack for holding or securing bottles adaptable to a shopping cart according to claim 2 comprising 6 or more receiving spaces.

4. A rack for holding or securing bottles adaptable to a shopping cart according to claim 1 wherein the fastening to or locking engagement to the shopping cart occurs to the top or side portion of the walls or sides of the shopping cart.

5. A rack for holding or securing bottles adaptable to a shopping cart according to claim 1 wherein the means for fastening to or locking engagement to the shopping cart is selected from the group consisting of a clip, a hook, a member adapted to fit over and engage a wall or side of the shopping cart, and a member adapted to fit over and engage a wall or side of the shopping cart through individual bands or strands forming the wall or side of the shopping cart passing through the spaces defined by the bands or strands.

6. A rack for holding or securing bottles adaptable to a shopping cart according to claim 1, wherein the rack for holding or securing bottles defines a top for the shopping cart when engaged therewith.

7. A rack for holding or securing bottles adaptable to a shopping cart according to claim 1, wherein the rack for holding or securing bottles engages the shopping cart within a receiving space defined by the walls or sides of the shopping cart.

8. A rack for holding or securing bottles adaptable to a shopping cart according to claim 1, wherein the rack for holding or securing bottles is collapsible.

9. A rack for holding or securing bottles adaptable to a shopping cart according to claim 1, wherein the rack for holding or securing bottles is collapsible with respect to one or more walls or sides of the shopping cart.

10. A rack for holding or securing bottles adaptable to a shopping cart according to claim 1, wherein the rack for holding or securing bottles is removable from the shopping cart.

11. A rack for holding or securing bottles adaptable to a shopping cart according to claim 1 wherein the plurality of receiving spaces are arranged in a single plane.

12. A rack for holding or securing bottles adaptable to a shopping cart according to claim 1 wherein the plurality of receiving spaces are arranged in two planes.

13. A shopping cart comprising a rack for holding or securing bottles adaptable to the shopping cart having a plurality of receiving spaces and a means for fastening to or locking engagement to the shopping cart, wherein the receiving spaces are adapted to engage or restrain the bottles at the neck or body of the bottles.

14. A shopping cart according to claim 13 wherein the receiving spaces are substantially circular in shape and of two or more varying diameters or circumferences.

15. A shopping cart according to claim 13 wherein the rack for holding or securing bottles adaptable to a shopping cart comprises 6 or more receiving spaces.

16. A shopping cart according to claim 13 wherein the fastening to or locking engagement to the shopping cart occurs to the top or side portion of the walls or sides of the shopping cart.

17. A shopping cart according to claim 13 wherein the means for fastening to or locking engagement to the shopping cart is selected from the group consisting of a clip, a hook, a member adapted to fit over and engage a wall or side of the shopping cart, and a member adapted to fit over and engage a wall or side of the shopping cart through individual bands or strands forming the wall or side of the shopping cart passing through the spaces defined by the bands or strands.

18. A shopping cart according to claim 13 wherein the rack for holding or securing bottles defines a top for the shopping cart when engaged therewith.

19. A shopping cart according to claim 13 wherein the rack for holding or securing bottles engages the shopping cart within a receiving space defined by the walls or sides of the shopping cart.

20. A shopping cart according to claim 13 wherein the rack for holding or securing bottles is collapsible.

21. A shopping cart according to claim 13 wherein the rack for holding or securing bottles is collapsible with respect to one or more walls or sides of the shopping cart.

22. A shopping cart according to claim 13 wherein the rack for holding or securing bottles is removable from the shopping cart.

23. A shopping cart according to claim 13 wherein the plurality of receiving spaces are arranged in a single plane.

24. A shopping cart according to claim 13 wherein the plurality of receiving spaces are arranged in two planes.

\* \* \* \* \*